United States Patent [19]

Hubbard

[11] Patent Number: 4,703,333

[45] Date of Patent: Oct. 27, 1987

[54] IMPULSE INK JET PRINT HEAD WITH INCLINED AND STACKED ARRAYS

[75] Inventor: David W. Hubbard, Stamford, Conn.

[73] Assignee: Pitney Bowes Inc., Stamford, Conn.

[21] Appl. No.: 823,904

[22] Filed: Jan. 30, 1986

[51] Int. Cl.[4] .............................................. G01D 15/18

[52] U.S. Cl. .................................. 346/140 R; 346/145

[58] Field of Search .................... 346/140, 75, 1.1, 145

[56] References Cited

U.S. PATENT DOCUMENTS

| | | | |
|---|---|---|---|
| 3,107,630 | 10/1963 | Johnson et al. . | |
| 3,211,088 | 10/1965 | Naiman . | |
| 3,298,030 | 1/1967 | Lewis et al. . | |
| 3,560,988 | 2/1971 | Krick | 346/75 X |
| 3,580,515 | 5/1971 | Cassill | 346/75 X |
| 3,683,212 | 8/1972 | Zoltan . | |
| 3,747,120 | 7/1973 | Stemme . | |
| 3,946,398 | 3/1976 | Kyser et al. . | |
| 4,032,929 | 6/1977 | Fischbeck | 346/140 |
| 4,189,734 | 2/1980 | Kyser et al. . | |
| 4,216,483 | 8/1980 | Kyser et al. . | |
| 4,339,763 | 7/1982 | Kyser et al. . | |
| 4,364,067 | 12/1982 | Koto | 346/140 |
| 4,525,728 | 6/1985 | Koto . | |
| 4,528,575 | 7/1985 | Matsuda | 346/140 |

FOREIGN PATENT DOCUMENTS

| | | |
|---|---|---|
| 3331488 | 3/1984 | Fed. Rep. of Germany . |
| 55-71570 | 5/1980 | Japan . |

*Primary Examiner*—Joseph W. Hartary
*Attorney, Agent, or Firm*—Peter Vrahotes; Melvin J. Scolnick; David E. Pitchenik

[57] ABSTRACT

An impulse ink jet print head of the type in which a plurality of plates are held together in a superposed relationship to form an array. Nozzles for ejecting ink droplets towared a printing surface are located near an of the array and have axes which extend transversely to the planes of the plates. A frame holds a plurality of the arrays in a shingled relationship inclined with respect to the printing surface. The axes of the nozzles are all parallel. They are inclined in the direction of movement of the printing surface and at an angle from a perpendicular to the receiving surface whose sine is the ratio of the velocity of the printing surface divided by droplet velocity. With this arrangement, the droplets are traveling relatively in a direction perpendicular as they strike the printing surface. Furthermore, so long as the ratio of the velocities of the printing surface and of the droplets remains constant, accuracy of placement of the ink droplets on the printing surface is assured regardless of the distance between the nozzle and the receiving surface.

18 Claims, 15 Drawing Figures

IMPULSE INK JET PRINT HEAD WITH INCLINED AND STACKED ARRAYS

BACKGROUND OF THE INVENTION

I. Field of the Invention

The present invention relates to an impulse ink jet print head comprised of a plurality of arrays mounted in an inclined and stacked manner for compactness and for accommodating variations in nozzle to paper distance. The present invention also relates to a new method of using an impulse ink jet print head.

II. Description of the Prior Art

Ink jet system, and particularly impule ink jet systems, are well known in the art. The principle behind an impulse ink jet as embodied in the present invention is the displacement of ink and the subsequent emission of ink droplets from an ink chamber through a nozzle by means of a driver mechanism which consists of a transducer (e.g., of piezoceramic material) bonded to a thin diaphragm. When a voltage is applied to the transducer, the transducer attempts to change its planar dimensions, but because it is securely and rigidly attached to the diaphragm, bending occurs.

This bending displaces ink in the chamber, causing outward flow both through an inlet from the ink supply, or restrictor, and through an outlet or nozzle. The relative fluid impedances of the restrictor and nozzle are such that the primary outflow is through the nozzle. Refill of the ink chamber after a droplet emerges from the nozzle results from the capillary action of the ink meniscus within the nozzle which can be augmented by reverse bending of the transducer. Time for refill depends on the viscosity and surface tension of the ink as well as the impedance of the fluid channels. A subsequent ejection will then occur but only when refill has been accomplished and when, concurrently, the amplitude of the oscillations resulting from the first ejection have become negligible. Important measures of performance of an ink jet are the response of the meniscus to the applied voltage and the recovery time required between droplet ejections having uniform velocity and droplet diameter.

In general, it is desirable to employ a geometry that permits several nozzles to be positioned in a densely packed array. In such an array, however, it is important that the individual nozzles eject ink droplets of uniform diameter and velocity even at varying droplet ejection rates.

Some representative examples of the prior art will now be described. U.S. Pat. No. 3,107,630 to Johnson et al is an early disclosure of the use of piezoceramic transducers being utilized to produce a high frequency cyclic pumping action. This was followed by U.S. Pat. No. 3,211,088 to Naiman which discloses the concept of an impulse ink jet print head. According to Niaman, when a voltage is applied to a transducer, ink is forced through the nozzle to form a spot upon a printing surface. The density of the spots so formed is determined by the number of nozzles employed in a matrix. Another variation of print head is disclosed in U.S. Pat. No. 3,767,120 issued to Stemme which utilizes a pair of chambers positioned in series between the transducer and the discharge nozzle.

Significant improvements over then then existing prior art are disclosed in a series of patents issued to Kyser et al, manely, U.S. Pat. Nos. 3,946,398, 4,189,734, 4,216,483, and 4,339,763. According to each of these disclosures, fluid droplets are projected from a plurality of nozzles at both a rate and in a volume controlled by electrical signals. In each instance, the nozzle requires that an associated transducer, and all of the components, lie in planes parallel to the plane of the droplets being ejected.

A more recent disclosure of an ink jet print head is provided in the U.S. Pat. No. 4,525,728 issued to Koto. In this instance, the print head includes a substrate having a plurality of pressurization chambers of rectangular configuration disposed thereon. Ink supply passages and nozzles are provided for each pressurization chamber. Each chamber also has a vibrating plate and a piezoceramic element which cooperate to change the volume of the pressurization chamber to cause ink to be ejected from the respective nozzles thereof.

In many instances of the prior art, ink jet print heads are assembled from a relatively large number of discrete components. However, the cost of such a construction is generally very high. For example, an array of ink jets requires an array of transducers.

Typically, each transducer is separately mounted adjacent to the ink chamber of each jet by an adhesive bonding technique. This presents a problem when the number of transducers in the array is greater than, for example, a dozen, because complications generally arise due to increased handling complexities, for example, breakage or failure of electrical connections. In addition, the time and parts expense rise almost linearly with the number of separate transducers that must be bonded to the diaphragm. Furthermore, the chances of a failure or a wider spread in performance variables such as droplet volume and speed, generally increase. Additionally, in many instances, prior art print heads were large and cumbersome and could accommodate relatively few nozzles within the allotted space.

Typical ink jet arrays for print heads are fabricated by stacking thin laminations of steel or glass with appropriate openings and passages. Component parts are: the diaphragm which supports the piezoceramic transducers or drivers, the ink chamber, the nozzle plate, the inlet restrictor, the ink supply manifold and the base plate. In order to achieve close nozzle spacing and yet provide sufficient size for the transducers, various methods of fanning, interlacing and long passges between transducer and nozzle are used. In some arrangements the nozzles are located in the center of a planar surface. Others run the ink passsages to the edge of the laminate stack and either have a rectangular orifice made of a multiple of laminates or form a normal round orifice by placing an additional plate at right angles to the laminations. However, in most instances these prior constructions did not achieve the compactness and level of quality required for commercial applications.

SUMMARY OF THE INVENTION

It was with knowledge of the prior art and the problems existing which gave rise to the present invention. In brief, the present invention is directed towards an improved impulse ink jet print head and a method of using such an improved print head.

The print head of the invention is of the type in which a plurality of plates are held together in a superposed relationship to form an array. Nozzles for ejecting ink droplets toward a printing surface are located near an end of the array and have axes which extend transversely of the planes of the plates. A frame holds a plurality of the arrays in a shingled relationship inclined with respect to the printing surface. The axes of the nozzles are all parallel. They are inclined in the direction of movement of the printing surface and at an angle from a perpendicular to the receiving surface whose sine is the velocity of the printing surface divided by droplet velocity. With this arrangement, the droplets are travelling in a relatively perpendicular direction as they strike the printing surface. Furthermore, so long as the ratio of the velocities of the printing surface and of the droplets remains constant, uniformity of spacing of the ink droplets on the printing surface from a particular nozzle is assured regardless of the distance between the nozzle and the receiving surface.

In order to reduce the number of laminations, and hence the cost, an arrangement such as that disclosed is advantageous in that there is a minimum number of parts. In one embodiment, the inlet restrictor orifice is in the same laminate sheet as the nozzle and diaphragm. An array of 12 or more nozzles, at a spacing of 0.060 inches each would be of sufficient length to print a postage indicia and a stack of six such arrays would provide a dot spacing of 100 per inch. The arrays are nested, or shingled, so as to condense the distance between the first and last array of nozzles providing a more compact head and easing the tolerances on relative motion control and improving dot placement accuracy. Typical droplet emission rates and velocities would be 3 KHz at 120 in./sec. with a dot spacing of 0.010 inch. This implies a paper velocity (or head velocity) of 30 in./sec. which is also a typical and not a rigidly established value. If the angle of incline is arcsin (30/120) or approximately 14°, the relative motion of the droplet approaching the paper is perpendicular and thus any variation in distance between the array assembly and the paper surface will not produce any deviation from the intended dot placement. Additionally, the nozzles are protected from accidental contact with the passing paper thus extending the life of any coating ("TEFLON", or the like) that might be on the face of the nozzle plate to modify and control ink wetting.

The assembly of arrays is contained in a box-like frame with internal grooves to locate them in a spaced but parallel relationship. In the preferred arrangement contemplated, but not intended to be restrictive of the invention, each array has its own electrical leads and ink supply. An alternative arrangement would have the electrical leads and ink supply lead to the box which would then have appropriate ink passages built in so as to lead ink into the individual arrays. A clamping and sealing system insures ink and electrical integrity.

A further advantage of this invention is the breakdown of a complete print head into smaller units, for example, six arrays of 12 nozzles for a complete print head of 72 nozzles that could print an indicia 0.71 inches high in one pass. Any manufacturing operation has a reject or failure rate associated with the process. For example, piezoceramic transducers may lose polarization, electrodes may fail, nozzles may become clogged, etc., requiring the assembly to be scrapped. A disadvantage of a large monolithic assembly is that a failure of one element causes many good elements to be lost. The combination of many identical parts on one assembly does however reduce the per unit manufacturing cost by the elimination of handling and allowing for automation. In this regard, the relative influence of different array arrangements on yield and scrap ratios has been considered in arriving at the embodiment disclosed. From experience, it has been determined that for scrap rates to be kept below, say 33%, the failure rate for individual transducers has to be better than 0.5% in the case of a $1\times72$ array and better than 3% for a $6\times12$ array. Thus, a $6\times12$ arrangement can tolerate an individual reject rate six times higher than that of a $1\times72$ array.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of this invention, illustrate some embodiments of the invention and, together with the description, serve to explain the principles of the invention in general terms. Throughout the disclosure, like numerals refer to like parts.

DESCRIPTION OF THE PREFERRED EMBODIMENTS

Figure 1A:
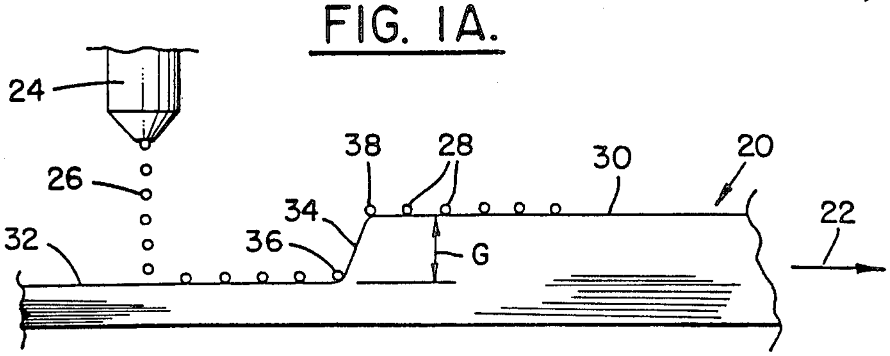
FIGS. 1A and 1B are diagrammatic side elevation and top plan views, respectively, illustrating the placement of individual ink droplets onto an irregular printing surface using an ink jet print head of the prior art.
Figure 1B:
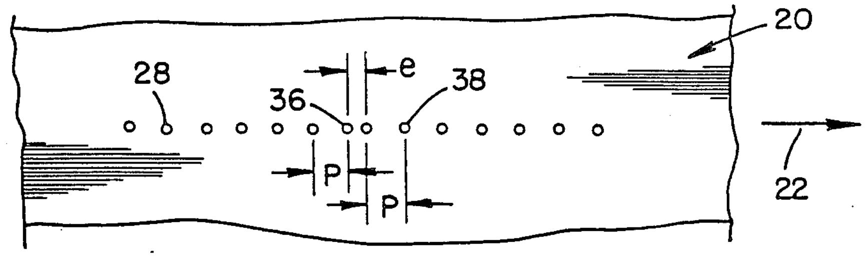
PRIOR ART FIG. 1B.

Turn now to the drawings and initially to FIGS. 1A and 1B which diagrammatically illustrate the operation of an ink jet nozzle typical of the prior art. As illustrated, a printing surface 20 is moved in the direction of an arrow 22 beneath an ink jet nozzle 24 ejecting ink droplets 26 at a uniform rate toward the printing surface. It should be understood that for purposes of the invention it is of no consequence whether only the printing surface 20 is moved, only the nozzle 24 is moved, or both are moved simultaneously. The invention encompasses all modes of operation in which there is relative movement between the printing surface and the nozzle.

In any event, when the ink droplets 26 reach the printing surface 20, they form individual dots 28 which are uniformly spaced by a distance p (FIG. 1B) so long as the ejection rate from the nozzle is uniform and so long as the printing surface remains flat. In this context, flat is taken to mean that the perpendicular distance between the nozzle and the printing surface remains constant. Thus, in those regions of the printing surface 20 indicated by reference numerals 30 and 32 (FIG. 1A), the spacing of the dots 28 along the printing surface is uniform. However, this is not the case at a region 34 which represents an irregularity in the printing surface. Such an irregularity may be representative of a defect in the printing surface or merely a change in thickness such as in an envelope at the location where the contents terminate. It will be appreciated that a droplet forming a dot 36 will have traveled a farther distance than a droplet forming a dot 38. Therefore, during the extra time that it takes for the droplet to travel to the printing surface 20, the printing surface will have moved farther to the right resulting in an error in placement e (FIG. 1B) where e is represented by the expression:

$$e=(G\times E)\div v$$

where,

G is the additional increment in the flight path of a droplet,

E is the velocity of the printing surface, and v is the droplet velocity.

Thus, if the additional increment in flight G is 0.060 inches and droplet velocity is 120 in./sec. and printing surface velocity is 30 in./sec., then the error e equals 0.015 inches. This error e is equivalent to 1.5 dot diameters where a dot diameter is 0.010 inches. Such irregular spacing, represented at region 34 in FIG. 1B is by the sum of p and e, is unacceptable if high qaulity printing is a goal of the system.

Figure 2A:
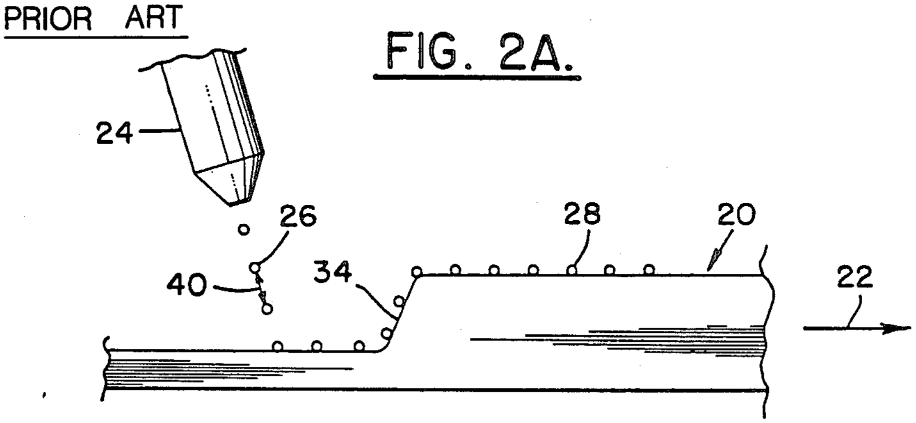
PRIOR ART FIG. 2A.
FIGS. 2A and 2B are diagrammatic side elevation and top plan views, respectively, illustrating the placement of individual ink droplets onto an irregular printing surface using an ink jet print head embodying the present invention.
Figure 2B:
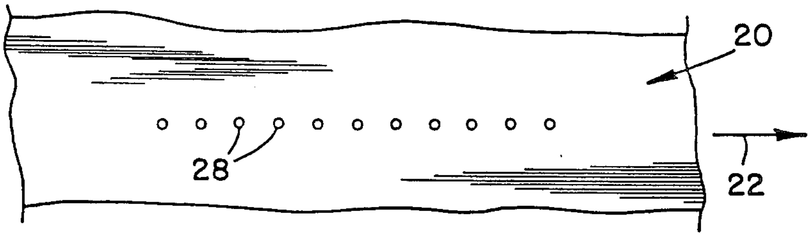

Turn now to FIGS. 2A and 2B which diagrammatically illustrate the manner in which the present invention solves this preexisting problem. According to the invention, the print head 24 is inclined relative to the printing surface 20 such that the path of the ink droplets 26 is also inclined relative to the printing surface. It has been found that when a particular relationship exists as to three variables, namely (1) the velocity of the ink droplets 26, (2) the velocity of the printing surface 20 in the direction of the arrow 22 relative to the print head 24, and (3) the angle t which the print head is inclined relative to the printing surface, the spacing of the dots 28 remains uniform notwithstanding the irregularity present at the region 34.

In order to achieve the uniformity of spacing most clearly illustrated in FIG. 2B, it is necessary that an angle of approach 40 of an ink droplet onto the printing surface 20 be perpendicular. That is, to an imaginary observer positioned on the printing surface 20, the droplets 26 would appear to be approaching the surface from directly overhead. This effect occurs when a path along which the ink droplets 26 advance toward the printing surface 20 forms an angle with a line perpendicular to the surface whose sine is equal to the velocity of the printing surface in the direction of the arrow 22 divided by the droplet velocity, that is the velocity of the droplets 26 as they advance toward the printing surface 20.

Figure 3:
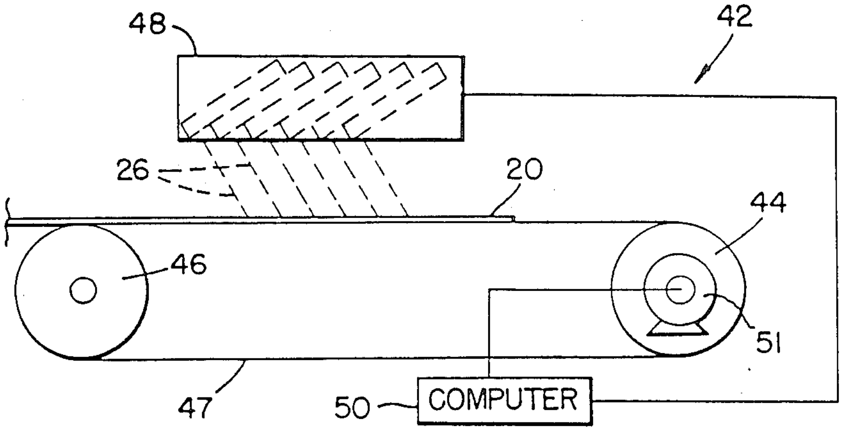
FIG. 3 is a side elevation view schematically illustrating a control system for operating an array of ink jet print heads embodying the invention.

In FIG. 3 is illustrated, diagrammatically, a printing system 42 utilizing the concept just described. As illustrated, the printing surface 20 is suitably advanced by means of a pair of rollers 44 and 46 and a belt 47 so that a print head 48 can direct ink droplets 26 onto the printing surface according to a predetermined pattern. The paths of travel of the ink droplets 26 are inclined relative to the printing surface 20. A computer 50 monitors the speed of the roller 44 in advancing the printing surface 20 by means of a variable speed motor 51.

It will be appreciated that the velocity of the droplets is not generally controllable by the computer 50. Rather, the velocity of a droplet is a value dependent upon the geometry of the print head and the characteristics of the ink. The design of an ink jet print head may typically take the following sequence:

(1) Determine the velocity of droplets to be ejected by print head;

(2) Determine the velocity of the paper which is a function of the desired dot pitch and resolution and operating frequency of the print head;

(3) Calculate the sine of the velocity ratio; and (4) Mount the print head at the calculated angle.

Figure 4:
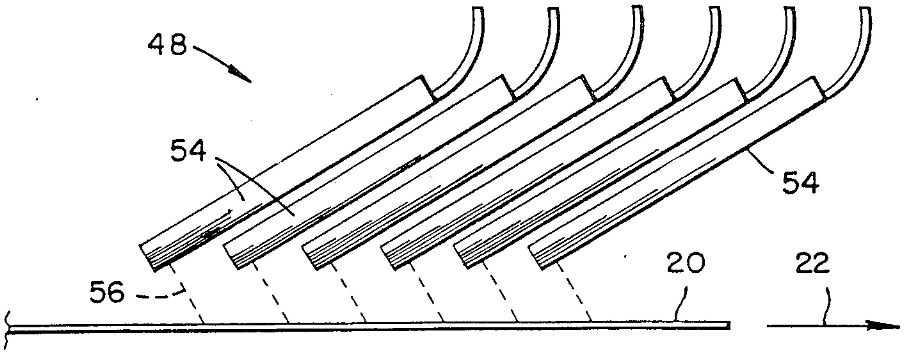
FIG. 4 is a diagrammatic side elevation view illustrating an array of ink jet print heads embodying the present invention.

In FIG. 4, the print head 48 is illustrated, enlarged from FIG. 3. The print head is comprised of a plurality of nozzle arrays 54 positioned in an inclined and stacked manner for compactness and so as to incline paths 56 of the droplets issuing from each of the nozzle arrays.

Figure 5:
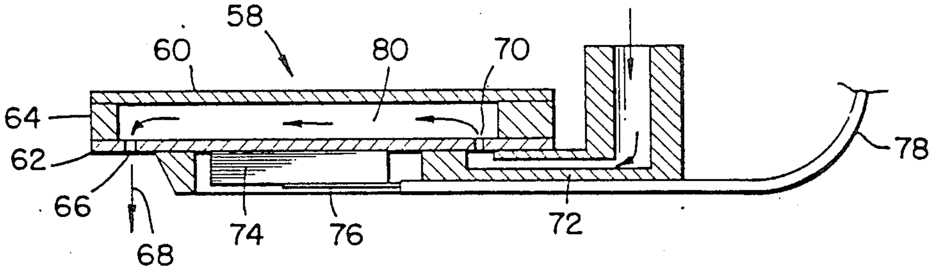
FIG. 5 is a side elevation view, in cross section, illustrating one embodiment of a print head embodying the invention.
Figure 7:
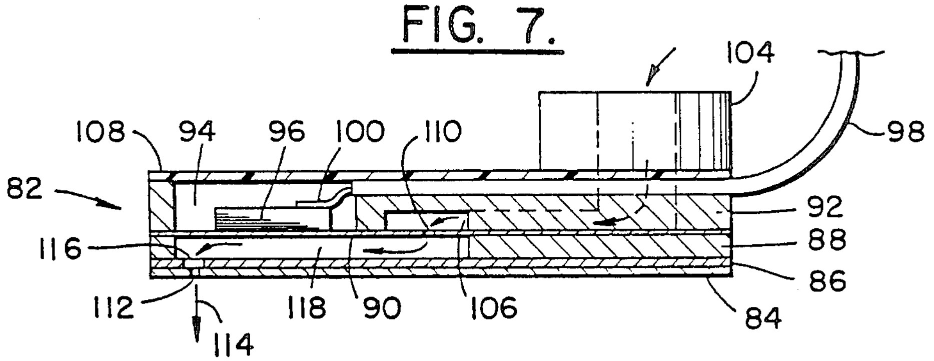
FIG. 7 is a cross section view taken generally along line 7—7 in FIG. 6.
Figure 6:
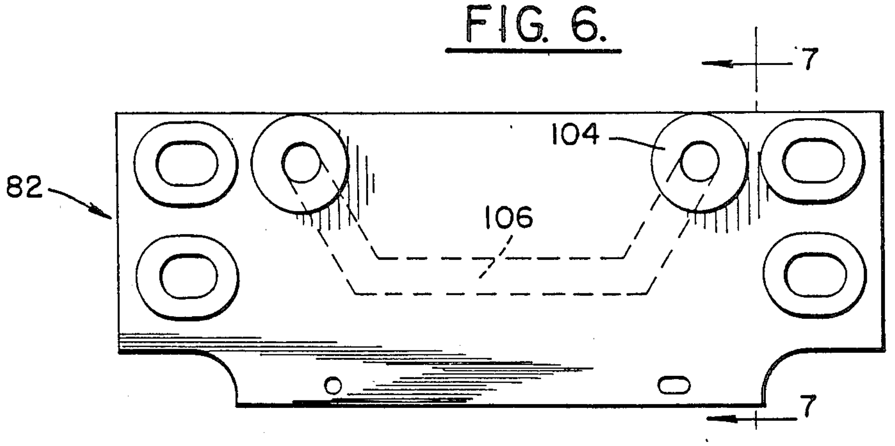
FIG. 6 is a top plan view illustrating another embodiment of the invention.
Figure 8:
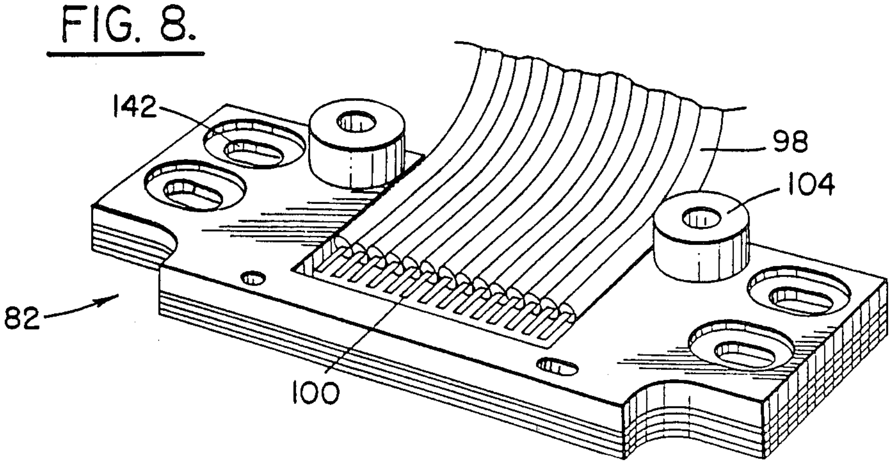
FIG. 8 is a perspective view of the array illustrated in FIGS. 6 and 7 but with a cover plate removed.
Figure 9:
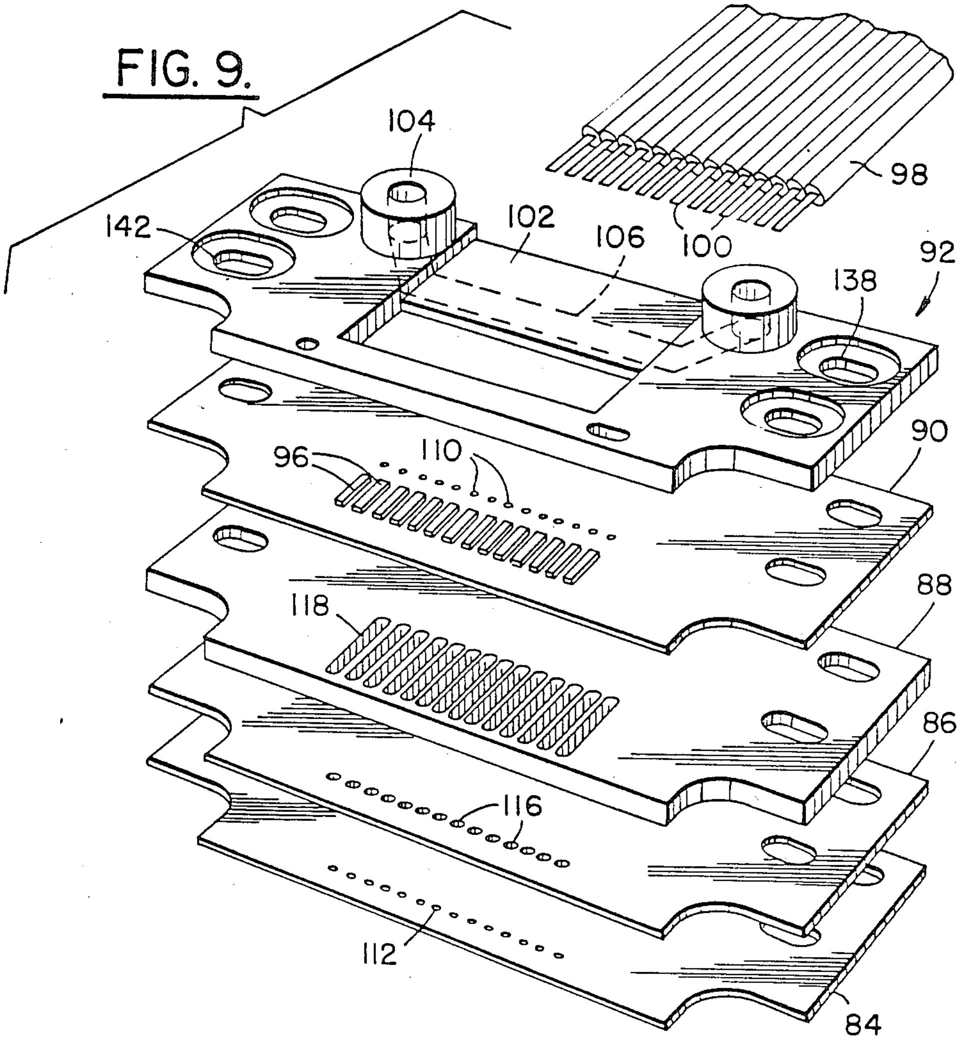
FIG. 9 is an exploded perspective view of the array illustrated in FIG. 8.

FIG. 5 illustrates the interior of one embodiment of a nozzle array 54 and, for purposes of clarity, is referred to by a reference numeral 58. It represents a construction of a nozzle array utilizing an economy of components. Specifically, the number of laminations employed is reduced to a minimum. To this end, the nozzle array 58 is comprised of a base plate 60 and a nozzle plate 62 with a chamber plate 64 sandwiched between the base plate and the nozzle plate. The nozzle plate 62 is provided with at least one nozzle 66 thru which droplets are ejected in a customary manner in the direction of an arrow 68.

Also located in the nozzle plate 62 at a location distant from the nozzle 66 is a restrictor orifice 70 which is in communication with a supply manifold 72 suitably connected to a source of printing ink in a customary fashion. The restrictor orifice 70 has an opening which is smaller than the nozzle 66.

A transducer 74 of piezoceramic or other suitable material is bonded to a surface of the nozzle plate 62. Leads 76 from an electrical cable 78 are suitably affixed to the transducer 74 and when an electrical potential is applied thereto, the transducer causes the nozzle plate to bend inwardly in the direction of a chamber 80 defined by the plates 60, 62, and 64.

This movement of the nozzle plate into the chamber 80 causes displacement of the ink within the chamber and eventual ejection from the nozzle 66 as the path of least resistance. It will be appreciated that in the construction of the nozzle array 58, in order for both the nozzle 66 and the restrictor orifice 70 to be in the same plate 62, it is necessary for the supply manifold 72 to be positioned at the underside of the array. This added thickness of material at this location can be undesirable in some instances and it was for this reason that the next embodiment was devised.

Another, and preferred, embodiment of the invention is illustrated in the form of a nozzle array 82 depicted in FIGS. 6–9. Viewing especially FIG. 7, the nozzle array 82, as with the array 58, is composed of a plurality of laminations. A first grouping of laminations is preferably fabricated from stainless steel, although other suitable non-corrosive materials including glass and nickel can be used. This first grouping comprises a nozzle plate 84, a base plate 86, a chamber plate 88 and a diaphragm plate 90. Typically, these plates may have thicknesses, respectively of 0.003, 0.022, 0.012, and 0.003 inches for a total thickness of approximately 0.040 inches. These plates are all bonded together. This may be accomplished by diffusion bonding, a nickel braze, or vacuum bonding, and brazing alloys such as nickel phosphorous or silver may be used. A manifold 92 is preferably composed of a plastic material such as "RYTON" for reasons including ink compatibility, stability, moldability, and low cost. The manifold is bonded to an upper surface of the diaphragm plate and is provided with an extensive window 94 sized to protectively encompass transducers 96, preferably made of a piezoceramic material. An electrical cable 98 connected to a suitable voltage source has exposed leads 100 which are suitably bonded to, or at least frictionally engaged with, transducers 96. As seen particularly well in FIG. 9, the manifold 92 is provided with an integral recessed shelf member 102 adapted to support the cable 98.

Each manifold 92 is also provided with a pair of fill tubes 104 which are connected by a channel 106 formed in the underside of the manifold. The window 94 provides a more than adequate space to accommodate the oscillating movements of the transducers 96 and the diaphragm plate 90 in the course of operation of the array 82. A cover plate 108, preferably composed of foam plastic sheet material such as polystyrene, is suitably bonded to the manifold 92 so as to overlie the window 94 and cable 98 and thereby protect the transducer 96 and the cable 98. The cover plate 108 also seves to dampen vibrations and to provide a resilient buffer between adjacent arrays 82 positioned in a manner to be described below.

The diaphragm plate 90 is provided with a plurality of laterally spaced restrictor orifices 110 positioned adjacent to and communicating with the channel 106. The nozzle plate 84 is similarly provided with a like plurality of laterally spaced enlarged openings 116, each contiguous to an associated nozzle 112 but of substantailly greater magnitude. In the course of operation of the nozzle array 82, as to each nozzle 112, ink is drawn through the fill tube 104, through the channel 106, and through the restrictor orifice 110 into an associated chamber 118 defined by the chamber plate 88 and the diaphragm and base plates, 90 and 86, respectively, bonded to it on its opposite sides. When the cable 98 is energized, the transducer 96 is excited, bending the diaphragm plate 90 into the chamber 118, thereby displacing the ink captured therein and causing it to be ejected through the opening 116, then through the nozzle 112 and on toward a suitable printing surface.

Figure 10:
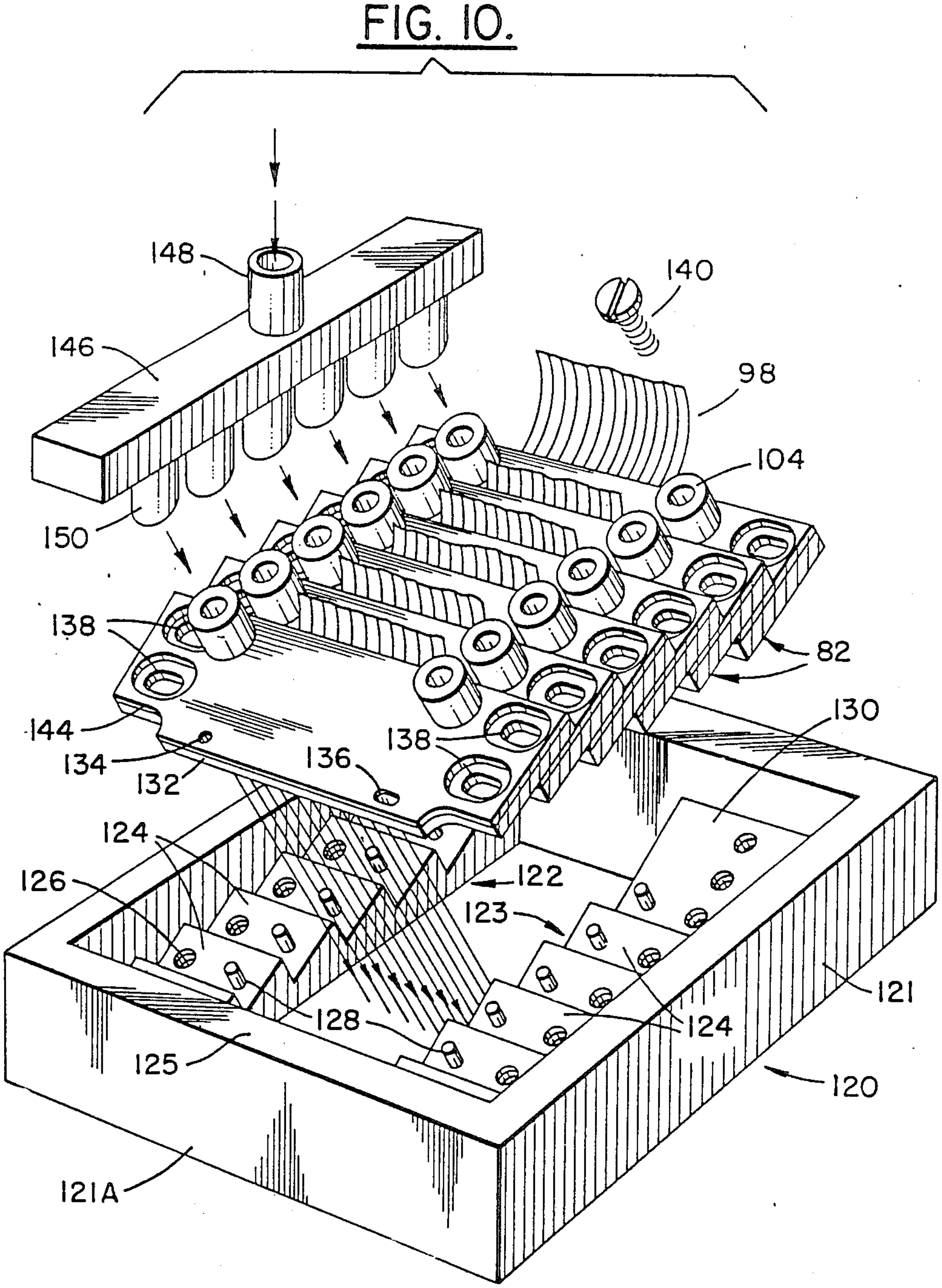
FIG. 10 is an exploded perspective view illustrating a plurality of arrays mounted in a frame to form a print head.
Figure 12:
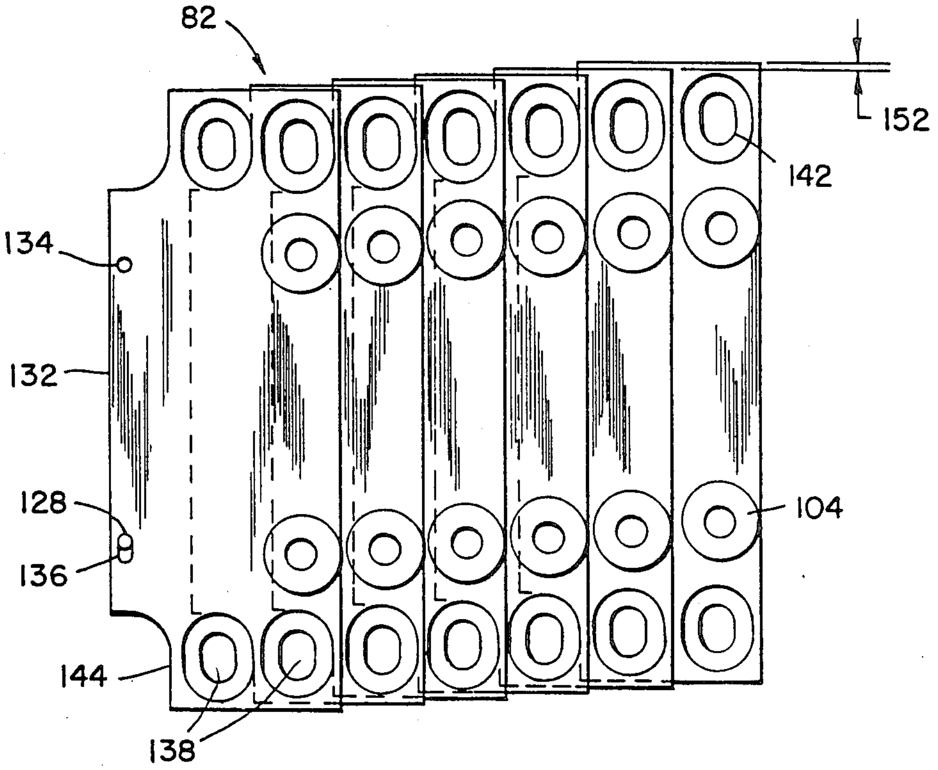
FIG. 12 is a top plan view illustrating a plurality of arrays as they are positioned within the print head.
Figure 11:
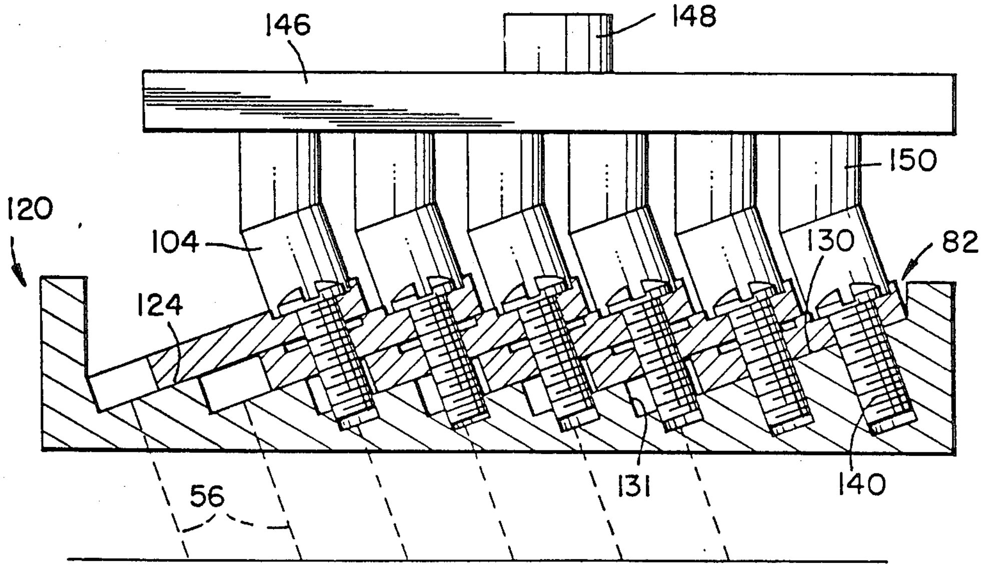
FIG. 11 is a side elevation view of an assembled print head, certain parts being cut away and in section.

As illustrated in FIGS. 10–12, a plurality of nozzle arrays 82 are mounted in a contiguous, inclined, and stacked manner by means of a rectangular frame 120 having no bottom and top but provided with a pair of spaced apart longitudinal walls 121 and a pair of spaced apart lateral walls 121A joined with the longitudinal walls. Each of the longitudinal walls has mounted thereon within the frame 120 a pair of supporting elements. Specifically, a first supporting element 122 is mounted on one of the longitudinal walls and extends therealong, and a second supporting element 123 is mounted on the other of the longitudinal walls and extends therealong parallel to and spaced from the first supporting element 122. Each of the supporting elements has a plurality of stepped supporting surfaces 124 which are inclined relative to an outer surface 125 of the frame 120. Each supporting surface 124 on one of the supporting elements 122 has a cooperating and associated surface 124 on its opposite supporting element 123. Additionally, each supporting surface is provided at its outboard regions with a tapped hole 126 and at its inboard regions with an outstanding peg 128. A pair of supporting surfaces 130 at one end of the frame 120, while having only one outstanding peg 128 on each, have three tapped holes at their outboard regions. As is most clearly seen in FIG. 11, the supporting surface 130 receives a first of the arrays 82. A riser suface 131 between the surface 130, its successive surface 124, and each successive surface 124 thereafter, is substantially equal to the thickness of each array.

As most clearly seen in FIG. 10, each array has a forward edge 132 which engages an associated riser surface 131 when an array 82 is positioned on its supporting surface 130 or 124. Inboard from the forward edge 132, are formed a pair of clearance holes 134 and 136, the latter being elongated in a lateral direction. A pair of larger clearance holes 138 also extend through the nozzle array 82 adjacent its outboard sides. With an array positioned for reception on a supporting surface 130 or 124, a peg 128 on one supporting element 122 is slidably received in its mating clearance hole 134 and the other peg 128 on the opposite supporting element 123 is slidably received in the clearance hole 136. Thereupon, screw fasteners 40 extend through the clearance holes 138 for threaded engagement with the tapped holes 126. Counterbores 142 formed in the upper surface of the manifold 92 and concentric with the clearance holes 138 serve to receive the head of the screw fastener 140 such that the top of the head does not protrude beyond the surface of the manifold 92. The cover plate 108 has bores 141 therethrough substantially the size of the counterbores 142 and coextensive therewith. Recesses 144 at the two forward lateral corners of the array 82 make room for the screw fastener 140 of each third level array being mounted on the frame 120. This is particularly well seen in FIG. 11.

A fill manifold 146 has an ink inlet 148 and a plurality of outlets 150 which mate with each of the fill tubes 104 to thereby provide an equalized flow of ink to each of the nozzle arrays 82.

Viewing FIG. 12, it is seen that each of the succedding arrays 82 is slightly offset by a dimension indicated by reference numeral 152 and succeeding offsets, from array to array are cumulative in the same direction. The magnitude of the offset 152 is equal to the lateral spacing between adjacent nozzles 112 of an array divided by the number of arrays in the print head, that is, mounted in the frame 120. Thus, for example, if the lateral spacing between individual nozzles 112 is 0.060 inches, and the number of arrays 82 is six, then the magnitude of the offset 152 is 0.060/6, or 0.010 inches. In this way, the print head, in one pass across the printing surface, can complete all portions of a character being printed, from top to bottom.

Figure 13:
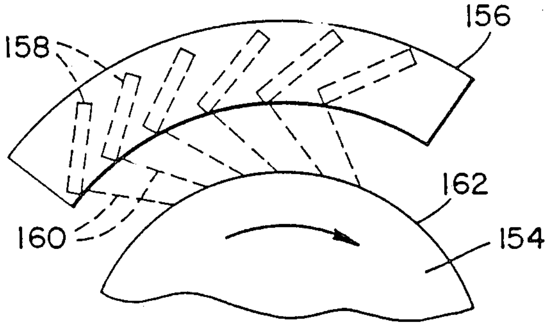
FIG. 13 is a detailed diagrammatic side elevation view illustrating the use of the invention for print on a curved surface.

Still another embodiment of the invention is illustrated in FIG. 13. In this embodiment, it is desired to utilize the principles of the invention already described to print on a curved surface such as on a rotating drum 154. As in the previous embodiments, a print head 156 is provided with a plurality of nozzle arrays 158, each of which operates to direct ink droplets along paths 160 onto a surface 162 of the rotating drum 154. The nozzle arrays 158 are generally of the construction of the arrays illustrated in FIGS. 6–9. The system of FIG. 13 is operated by first rotating the printing or receiving surface 162 at a predetermined rate about the axis of the cylinder. Ink droplets are then ejected at a predetermined velocity from the arrays 158 along the droplet paths 160 which are inclined, relative to a plane including the axis of the drum 154 and passing through the nozzle of each array in the direction of rotation of the drum as indicated by an arrow 164. The subtended angle between the axis of the nozzle and the plane is established as that angle whose sine is the rotational velocity of the printing surface 162 divided by the velocity of the ink droplets ejected by the nozzle. Well known mathematical accomodations would be made in the positioning of the nozzles relative to the printing surface in the event the printing surface is not cylindrical but is of some other shape.

While the preferred embodiments of the invention have been disclosed in detail, it should be understood by those skilled in the art that various modifications may be made to the illustrated embodiments without departing from the scope as described in the specification and defined in the appended claims.

I claim:

1. An array for an impulse ink jet print head of the type in which a plurality of plates are held together in a superposed relationship comprising:

a base plate;

a diaphragm plate having a nozzle for ejecting ink droplets therethrough and a restrictor orifice, said nozzle and said restrictor orifice having axes extending transversely through said diaphragm plate at spaced apart locations;

a chamber plate mounted in contiguous relationship intermediate said base plate and said diaphragm plate including continuously extending sidewall defining a chamber extending therethrough;

an ink supply in communication with said restictor orifice for supplying ink through said restrictor orifice into the chamber; and driver means mounted on said diaphragm plate operable to deflect said diaphragm plate to displace ink in the chamber thereby causing the ejection of ink droplets from said nozzle.

2. An array for an impulse ink jet print head of the type in which a plurality of plates are held together in a superposed relationship comprising:

a base plate;

a diaphragm plate having a plurality of laterally spaced nozzles for ejecting ink droplets therethrough and a plurality of laterally spaced restrictor orifices, said nozzles and said restrictor orifices having axes extending transversely through said diaphragm plate at longitudinally spaced apart locations;

a chamber plate mounted on said base plate intermediate said base plate and said diaphragm plate including a continuously extending sidewall defining a plurality of side by side chambers extending therethrough, one pair of said nozzles and restrictor orifices operatively associated with each of the chambers;

ink supply means for supplying ink into the chambers having a restrictor orifice upstream of each of the chambers; and a plurality of driver means mounted on said diaphragm plate, each of said driver means overlying an associated chamber and operable to deflect said diaphragm plate to displace ink in its associated chamber thereby causing the ejection of ink droplets from said associated nozzle.

3. An array for an impulse ink jet print head as set forth in claim 2 wherein each of said restrictor orifices is in said diaphragm plate and wherein said ink supply means includes an ink supply manifold in communication with each of said restrictor orifices.

4. An array for an impulse ink jet print head as set forth in claim 2 wherein each of said restrictor orifices has an opening area smaller than that of its associated one of said nozzles.

5. An array for an impulse ink jet print head as set forth in claim 2 wherein said array is inclined relative to a printing surface at which said nozzles are directed.

6. An array for an impulse ink jet print head as set forth in claim 2 including frame means for mounting said array inclined relative to a printing surface at which said nozzles are directed.

7. An array for an impulse ink jet print head as set forth in claim 5 wherein the axes of all of said nozzles are parallel.

8. An array for an impulse ink jet print head as set forth in claim 5 wherein said nozzles and the printing surface are moving relative to one another; and wherein the axes of said nozzles are inclined in the direction of relative movement from an imaginary line perpendicular to the printing surface and extending through the nozzle at an angle whose sine is the ratio of the velocity of relative movement divided by the droplet velocity whereby the droplets are travelling relatively in a direction perpendiular to the printing surface as they strike the printing surface regardless of the distance between the nozzle and the printing surface.

9. An array for an impulse ink jet print head as set forth in claim 8 wherein said restrictor orifice is in said diaphragm plate and wherein said ink supply means includes an ink supply manifold in communication with said restrictor orifice.

10. In an impulse ink jet print head including a plurality of similar arrays, each of said arrays being of the type in which a plurality of plates are held together in a superposed relationship and having a like plurality of similarly spaced ink droplet ejecting nozzles therein aligned in a row, the improvement comprising:

frame means for mounting said arrays;

such that they are positioned in spaced apart parallel planes inclined relative to a printing surface at which said nozzles are directed, said row of said plurality of nozzles in one of said arrays being parallel to said row of each of said other arrays, all of said nozzles having parallel axes; and such that said row of said nozzles of each of said arrays is longitudinally offset relative to said row of said nozzles of each one of its neighboring said arrays to thereby provide an unobstructed path for droplet ejection from said nozzles of all of said arrays; and such that said row of said nozzles of each successive one of said arrays is laterally offset relative to its predecessor row by a fixed incremental distance, said row of said nozzles in a last of said arrays being offset from said row of said nozzles in a first of said arrays by a sum of said incremental distances.

11. An impulse ink jet print head as set forth in claim 10 wherein each of said arrays includes:

a base plate;

a diaphragm plate having a nozzle for ejecting ink droplets therethrough and a restrictor orifice, said nozzle and said restrictor orifice having axes extending transversely through said diaphragm plate at spaced apart locations;

a chamber plate mounted in contiguous relationship intermediate said base plate and said diaphgram plate including a continuosly extending sidewall defining a chamber extending therethrough;

an ink supply in communication with said restrictor orifice for supplying ink through said restrictor orifice into the chamber; and driver means mounted on said diaphragm plate operable to deflect said diaphragm plate to displace ink in the chamber thereby causing the ejection of ink droplets from said nozzle.

12. An impulse ink jet print head as set forth in claim 10 wherein each of said arrays includes:

a base plate;

a diaphragm plate having a plurality of laterally spaced nozzles for ejecting ink droplets therethrough and a plurality of laterally spaced restrictor orifices, said nozzles and said restrictor orifices having axes extending transversely through said diaphragm plate a longitudinally spaced apart locations;

a chamber plate mounted on said base plate intermediate said base plate and said diaphragm plate including a continuously extending sidewall defining a plurality of side by side chambers extending therethrough, one pair of said nozzles and restrictor orifices operatively associated with each of the chambers;

ink supply means for supplying ink onto the chambers having a restrictor orifice upstream of each of the chambers; and a plurality of driver means mounted on said diaphragm plate, each of said driver means overlying an associated chamber and operable to deflect said diaphragm plate to displace ink in its associated chamber thereby causing the ejection of ink droplets form said associated nozzle.

13. An impulse ink jet print head as set forth in claim 10 wherein said print head and the printing surface are moving relative to one another; and wherein the axis of said nozzles are inclined in the direction of relative movement from an imaginary line perpendicular to the printing surface and extending through the nozzles at an angle whose sine is the ratio of the velocity of relative movement divided by the droplet velocity whereby the droplets are travelling relatively in a direction perpendicular to the printing surface as they strike the printing surface regardless of the distance between the nozzle and the printing surface.

14. An array for an impulse ink jet print head as set forth in claim 8 wherein:

said driver means are operable for varying the rate of ejection of the droplets and including:

motive means operable for advancing the printing surface relative to said nozzles; and control means for operating said motive means and said driver means such that the ratio of the relative velocities of the printing surface and of the droplets remains constant to thereby assure uniformity of spacing of the ink droplets on the receiving surface regardless of the distance between the nozzle and the receiving surface.

15. In an impulse ink jet print head including a plurality of similar arrays, each of said arrays being of an elongated planar design having at least one ink ejecting nozzle therein adapted to eject ink droplets along a path transverse to a plane of said array, the improvement comprising:

a four-sided frame having two spaced apart longitudinal walls and two spaced apart lateral walls joined with said longitudinal walls;

first and second spaced apart supporting elements located within said frame;

said first supporting element being mounted on one of said longitudinal walls and extending therealong;

said second supporting element being mounted on the other of said longitudinal walls and extending therealong;

each of said supporting elements having a plurality of supporting surfaces for receiving said arrays thereon, said supporting surfaces being inclined relative to a major plane of said frame;

cooperating pairs of said supporting surfaces on said first and second supporting elements being coplanar;

each of said supporting elements having a plurality of riser surfaces lying in planes transverse to said supporting surfaces, each of said riser surfaces intersecting with successive pairs of said supporting surfaces; and means for mounting said arrays on said supporting surfaces; whereby the paths of the droplets being ejected by said nozzles are inclined relative to the major plane of said frame.

16. An impulse ink jet print head as set forth in claim 15 wherein said mounting means includes:

a peg fixed to each of said supporting surfaces and extending outwardly therefrom, said pegs in each successive one of said supporting surfaces on said first supporting element being laterally offset relative to its said predecessor peg;

a pair of peg receiving holes in each of said arrays positioned to matingly receive said pegs fixed to said associated supporting surfaces; and fastening means for joining said arrays on said supporting surfaces;

whereby the path of the droplets being ejected by each successive one of said nozzles is laterally offset relative to the path of the droplets from its said predecessor nozzle.

17. An impulse ink jet print head as set forth in claim 16 wherein each of said arrays has a laterally extending leading edge engageable with its associated said riser surface when supported on its associated one of said supporting surfaces such that said plurality of arrays assumes an inclined and stacked relationship within said frame.

18. An impulse ink jet print head as set forth in claim 17 wherein each of said arrays has a plurality of nozzles therein spaced from said leading edge and equally spaced apart laterally;

wherein each of said successive pegs on said first supporting element is uniformly relative to its said predecessor peg, said successive offsets being cumulative;

wherein all of said pegs on said second supporting elements are longitudinally aligned; and wherein said peg receiving holes in all of said arrays are uniformly located, those holes mating with said pegs on said second supporting element being elongated laterally to accommodate the offset of said pegs on said first supporting element.

* * * * *

UNITED STATES PATENT AND TRADEMARK OFFICE
CERTIFICATE OF CORRECTION

PATENT NO. : 4,703,333

DATED : October 27, 1987

INVENTOR(S) : David W. Hubbard

It is certified that error appears in the above—identified patent and that said Letters Patent is hereby corrected as shown below:

Column 1, line 65: "then" should be --the--. (1st occurrence)

Column 5, line 43: "qaulity" should be --quality--.

Column 5, line 55: "t" should be --at--.

Column 7, line 46: after "like" insert --plurality of laterally spaced nozzles 112 through which ink droplets are ejected in the direction of arrow 114. The base plate 86 is provided with a like--.

Column 8, line 36: "40" should be --140--.

Signed and Sealed this

Twenty-ninth Day of November, 1988

*Attest:*

DONALD J. QUIGG

*Attesting Officer*

*Commissioner of Patents and Trademarks*